(12) United States Patent
Mauchle et al.

(10) Patent No.: US 10,604,360 B2
(45) Date of Patent: Mar. 31, 2020

(54) DENSE PHASE POWDER PUMP AND CORRESPONDING OPERATING METHOD

(71) Applicant: GEMA SWITZERLAND GMBH, St. Gallen (CH)

(72) Inventors: Felix Mauchle, Abtwil (CH); Hanspeter Vieli, Goldach (CH); Hans-Peter Lüthi, Rickenbach (CH)

(73) Assignee: GEMA SWITZERLAND GMBH, St. Gallen (CH)

(*) Notice: Subject to any disclaimer, the term of this patent is extended or adjusted under 35 U.S.C. 154(b) by 0 days.

(21) Appl. No.: 16/140,275

(22) Filed: Sep. 24, 2018

(65) Prior Publication Data
US 2019/0023505 A1  Jan. 24, 2019

Related U.S. Application Data

(62) Division of application No. 14/782,298, filed as application No. PCT/EP2014/055446 on Mar. 18, 2014, now Pat. No. 10,112,787.

(30) Foreign Application Priority Data

Apr. 3, 2013  (DE) .................. 10 2013 205 895
Jun. 19, 2013  (DE) .................. 10 2013 211 536

(51) Int. Cl.
*B05C 19/00* (2006.01)
*B65G 53/66* (2006.01)
(Continued)

(52) U.S. Cl.
CPC ............ *B65G 53/66* (2013.01); *B05B 7/1404* (2013.01); *B05B 7/1459* (2013.01);
(Continued)

(58) Field of Classification Search
USPC ..... 118/308, 309, 683, 684; 417/65, 86, 390, 417/559; 427/180
See application file for complete search history.

(56) References Cited

U.S. PATENT DOCUMENTS 6,447,216 B1  9/2002  Higuchi et al.
7,163,359 B2  1/2007  Moser
(Continued)

FOREIGN PATENT DOCUMENTS

DE  10147858 A1  4/2003
DE  69529497 T2  10/2003
(Continued)

OTHER PUBLICATIONS

The German Search Report dated Jan. 17, 2014 for German Application No. 102013205895.0, 6 pages.
(Continued)

*Primary Examiner* — Yewebdar T Tadesse
(74) *Attorney, Agent, or Firm* — Kinney & Lange, P.A.

(57) ABSTRACT

A method and a dense phase powder pump for conveying coating powder from a first powder reservoir to a second downstream powder reservoir or to a downstream powder spray-coating gun or the like installation for spraying coating powder are disclosed. In order to reduce the number of components of the dense phase powder pump that require maintenance, the dense phase powder pump is designed as a single-chamber dense phase powder pump and has only a single powder conveyor chamber for conveying coating powder.

2 Claims, 7 Drawing Sheets

(51) Int. Cl.
*B05C 19/06* (2006.01)
*B05B 7/14* (2006.01)
*F04F 1/02* (2006.01)
*B65G 53/30* (2006.01)
*B65G 53/18* (2006.01)
*B65G 53/58* (2006.01)
*B65G 53/60* (2006.01)

(52) U.S. Cl.
CPC ............ *B05B 7/1463* (2013.01); *B05C 19/00* (2013.01); *B05C 19/06* (2013.01); *B65G 53/18* (2013.01); *B65G 53/30* (2013.01); *B65G 53/58* (2013.01); *B65G 53/60* (2013.01); *F04F 1/02* (2013.01)

(56) References Cited

U.S. PATENT DOCUMENTS

| | | |
|---|---|---|
| 2001/0003568 A1 | 6/2001 | Dietrich |
| 2005/0207901 A1 | 9/2005 | Klobucar et al. |
| 2007/0092380 A1 | 4/2007 | Fulkerson et al. |
| 2007/0095945 A1 | 5/2007 | Keudell et al. |
| 2014/0044578 A1* | 2/2014 | Sanwald ............... B05B 7/1459 417/559 |

FOREIGN PATENT DOCUMENTS

| | | |
|---|---|---|
| DE | 10300280 A1 | 7/2004 |
| DE | 10353968 A1 | 7/2005 |
| DE | 102005006522 B3 | 8/2006 |
| DE | 202006015697 U1 | 3/2007 |
| DE | 102006019643 A1 | 10/2007 |
| DE | 102007005313 A1 | 8/2008 |
| DE | 102007041551 A1 | 3/2009 |
| DE | 102007049219 A1 | 4/2009 |
| EP | 1297899 A1 | 4/2003 |
| WO | 9406516 A1 | 3/1994 |
| WO | 2008150790 A1 | 12/2008 |
| WO | 2009027805 A1 | 3/2009 |
| WO | 2013154702 A1 | 10/2013 |
| WO | 2014154373 A1 | 10/2014 |
| WO | 2014161717 A1 | 10/2014 |
| WO | 2014161718 A1 | 10/2014 |

OTHER PUBLICATIONS

The International Search Report dated Apr. 7, 2015 for International Application No. PCT/EP2014/055446, 6 pages.

* cited by examiner

DENSE PHASE POWDER PUMP AND CORRESPONDING OPERATING METHOD

CROSS-REFERENCE TO RELATED APPLICATIONS

This application is a division of U.S. Pat. No. 10,112,787 for DENSE PHASE POWDER PUMP AND CORRESPONDING OPERATING METHOD, filed Oct. 2, 2015 as U.S. patent application Ser. No. 14/782,298 (hereby incorporated by reference herein), which is the U.S. National Phase Application of PCT/EP2014/055446 filed Mar. 18, 2014, which claims benefit of German Application No. 102013205895.0 filed Apr. 3, 2013 and German Application No. 102013211536.9 filed Jun. 19, 2013.

BACKGROUND

The present invention relates to a dense phase powder pump for conveying coating powder.

Accordingly, the invention relates in particular to a dense phase powder pump for conveying coating powder from a first powder reservoir to a second powder reservoir arranged downstream of the dense phase powder pump or a powder spray-coating gun or similar device for spraying coating powder disposed downstream of the dense phase powder pump.

The invention further relates to a method of conveying coating powder from a first powder reservoir to a second powder reservoir disposed downstream of the first powder reservoir or a powder spray-coating gun or similar device for spraying coating powder disposed downstream of the first powder reservoir.

Dense phase powder pumps of the above type are generally known from the prior art.

For example, published document EP 1 551 558 A1 relates to a dense phase powder pump having a first powder conveyor chamber and a second powder conveyor chamber arranged parallel to the first powder conveyor chamber. The two powder conveyor chambers of this known prior art dense phase powder pump are limited both on the intake side as well as the discharge side by a mechanically actuated pinch valve arrangement.

It is specifically provided for the powder tube connected to the respective powder conveyor chambers of the dense phase powder pump to be deformable in the intake or respectively discharge region of the dense phase powder pump by means of a mechanical punch in order to squeeze or open the tube section as needed. A filter tube is allocated to each powder conveyor chamber of this known prior art dense phase powder pump which limits the circumference of the respective powder conveyor chamber. The filter tube is permeable to air but not to coating powder and is surrounded by an annular chamber to which negative pressure or compressed air can be alternatingly connected. Coating powder can thus be alternatingly suctioned into each powder conveyor chamber or expelled from the respective powder conveyor chamber by compressed air. The two parallel arranged powder conveyor chambers are actuated in phase opposition, which means that one of the two powder conveyor chambers draws in coating powder through the powder inlet of the dense phase powder pump while the other of the two powder conveyor chambers expels a portion of coating powder previously suctioned into the powder conveyor chamber via the powder outlet of the dense phase powder pump.

Dense phase powder pumps having a plurality, particularly two powder conveyor chambers connected in parallel are known from the WO 2005/005060 A2 (US 2006/0193704 A1) published document, the DE 199 59 473 A1 (US 2001/0003568 A1) published document and the EP 1 752 399 A1 published document.

The use of dense phase powder pumps to convey coating powder to respective devices for spraying coating powder, such as powder spray-coating guns in particular, is known from the DE 196 11 533 B4, WO 2004/087331 A1 and EP 1 566 352 A2 published documents.

Before the use of dense phase powder pumps of the above type to convey coating powder became known, powder pumps configured as injectors were used and these are still being used today in the conveyance of coating powder. However, unlike the dense phase powder pumps of the type cited above, powder pumps configured as injectors have the disadvantage of usually only being able to convey a small amount of coating powder per unit of time.

Dense phase powder pumps of the type cited at the outset have inasmuch become established in practice, particularly for applications in which a relatively large volume of coating powder is to be conveyed per unit of time.

Practical use has, however, shown that the operation of a dense phase powder pump such as known for example from the EP 1 551 558 A1 published document has multiple disadvantages particularly in terms of its maintenance and the resulting operational costs. This is due to the fact that—in contrast to powder pumps configured as injectors—a dense phase powder pump of the type described above has a relatively high number of components subject to continuous operation when the dense phase powder pump is in operation. For example, a conventional dense phase powder pumps makes use of at least four alternatingly actuated valves, whereby servicing a single valve inevitably entails the loss of the dense phase powder pump for a given maintenance period.

Because conventional dense phase powder pumps use at least two powder inlet valves on the intake side and at least two powder outlet valves on the discharge side, this accordingly inevitably reduces the span of time over which the dense phase powder pump can be operated without being serviced.

Moreover, conventional dense phase powder pumps require relatively complex operational diagrams in order to be able to coordinate the control of the pump's individual components subject to being alternatingly actuated.

Based on this problem, the present invention addresses the task of further developing a dense phase powder pump of the type cited at the outset to the effect of it needing fewer high-maintenance components, whereby at the same time the powder conveying capability of the pump remains as unchanged as possible.

It is furthermore a task of the invention to provide a simpler structural design of a dense phase powder pump as cited at the outset, in particular simplify it or reduce its size.

A correspondingly simplified method for conveying coating powder is moreover to be specified.

SUMMARY

Accordingly, the invention in particular specifies a dense phase powder pump for conveying coating powder from a first powder reservoir to a second powder reservoir arranged downstream (relative to the first powder reservoir) or to a powder spray-coating gun or similar mechanism for spraying coating powder arranged downstream, wherein the dense phase powder pump is designed as a single-chamber dense phase powder pump and in particular comprises just one single powder conveyor chamber for the conveying of coating powder.

The solution according to the invention is based on the surprising discovery that a continuous conveying of coating powder sufficient for practical use is also possible with a single-chamber dense phase powder pump; i.e. a dense phase powder pump which only has one single powder conveyor chamber for conveying coating powder.

The present invention overcomes the prejudice existing among experts to this point, namely that at least two parallel arranged and alternately actuated powder conveyor chambers need to be used in order to continuously convey coating powder, by the fact that the dense phase powder pump configured as a single-chamber dense phase powder pump can absolutely ensure a continuous conveying of coating powder, particularly when the pump frequency of the dense phase powder pump configured as a single-chamber dense phase powder pump, i.e. the frequency at which coating powder is suctioned into the single powder chamber and then dispensed again, is accordingly increased and/or when auxiliary compressed air is introduced at the powder outlet of the single powder conveyor chamber fluidly coupled before or after the powder outlet of the dense phase powder pump at suitable times as additional conveying compressed air in the powder path.

Introducing auxiliary compressed air into the powder path can homogenize the concentration of powder in the powder path.

Selectively introducing auxiliary compressed air into the powder path at the powder outlet of the powder conveyor chamber can in particular result in the flow rate of the conveyed powder assuming a constant value in the powder line downstream of the powder outlet of the dense phase powder pump and the powder being able to flow through the powder line homogeneously. It is hereby particularly advantageous when the amount of auxiliary compressed air fed into the powder path per pump cycle is identical or at least substantially the same as the amount of conveying compressed air supplied to the powder conveyor chamber per pump cycle which serves to pneumatically discharge portions of powder from the powder conveyor chamber.

Accordingly increasing the pumping frequency of the dense phase powder pump configured as a single-chamber dense phase powder pump, thus the frequency at which coating powder is suctioned into and then discharged again from the single powder conveyor chamber of the dense phase powder pump designed as a single-chamber dense phase powder pump and/or introducing auxiliary compressed air into the powder path downstream of the powder outlet of the powder conveyor chamber particularly in pulses and coordinated to the pumping frequency of the dense phase powder pump designed as a single-chamber dense phase powder pump can improve the fluidity of the coating powder conveyed by the dense phase powder pump downstream of the dense phase powder pump. Particularly at least one of these measures makes a consistent powder conveyance possible from the dense phase powder pump to a powder reservoir disposed downstream of the dense phase powder pump or a powder spray-coating gun or other device for spraying coating powder disposed downstream of the dense phase powder pump.

Compared to conventional dense phase powder pumps which are designed as multi-chamber dense phase powder pumps and comprise a plurality of, particularly two, powder conveyor chambers arranged parallel to one another and actuated in phase opposition to one another, the dense phase powder pump according to the invention can achieve a powder conveyance of a comparable uniformity without flow pulsations in the powder path downstream of the powder outlet of the dense phase powder pump, but wherein the number of operational components during the operation of the dense phase powder pump is significantly reduced and the structural configuration of the dense phase powder pump considerably simplified.

Thus, along with simultaneously decreasing the structural components and simultaneously simplifying the operational diagram required for the dense phase powder pump's operation, the present invention provides a particularly simple to realize yet effective alternative to conventional dense phase powder pumps designed as multi-chamber dense phase powder pumps.

According to one aspect of the present invention, the dense phase powder pump comprises a powder inlet connected or connectable to the (upstream situated) first powder reservoir and a powder outlet connected or connectable to the (downstream situated) second reservoir or to the (downstream situated) powder spray-coating gun or other such mechanism for spraying coating powder respectively. The powder inlet of the dense phase powder pump can thereby be arranged at a first end region of the dense phase powder pump and the powder outlet of the dense phase powder pump at an oppositely situated second end region of the dense phase powder pump, wherein the (single) powder conveyor chamber of the dense phase powder pump is arranged between the powder inlet and powder outlet of the dense phase powder pump.

In one advantageous realization of the present invention, the single powder conveyor chamber of the inventive dense phase powder pump has a powder inlet on a first end region and a powder outlet on an oppositely situated second end region, wherein the inventive dense phase powder pump further comprises a powder inlet valve as well as a powder outlet valve. The powder inlet of the (single) powder conveyor chamber is fluidly connected or connectable to the powder inlet of the dense phase powder pump by means of the powder inlet valve. On the other side, the powder outlet of the single powder conveyor chamber of the dense phase powder pump is connected or connectable to the powder outlet of the dense phase powder pump by means of the powder outlet valve.

According to another aspect of the present invention, the dense phase powder pump comprises a powder inlet connected or connectable to the first powder reservoir and a powder outlet connected or connectable to the second powder reservoir or to the powder spray-coating gun or other such mechanism for spraying coating powder, wherein the single powder conveyor chamber of the inventive dense phase powder pump comprises a powder passageway at one end region which serves as both a powder inlet as well as a powder outlet for the powder conveyor chamber. According to this aspect of the present invention, it is advantageous for the dense phase powder pump to further comprise a powder inlet valve as well as a powder outlet valve, whereby the powder passageway of the single powder conveyor chamber is fluidly connected or connectable to the powder inlet of the dense phase powder pump by way of the powder inlet valve and whereby the single powder conveyor chamber is fluidly connected or connectable to the powder outlet of the dense phase powder pump by way of the powder outlet valve.

According to one preferential realization, it is provided for the dense phase powder pump to further comprise a distributor in order to fluidly couple the powder passageway of the powder conveyor chamber to the powder inlet valve on the one side and to the powder outlet valve on the other side. Making use of a Y-piece as a distributor is hereby particularly conceivable. However, other embodiments are of course also conceivable.

A control unit designed to alternatingly actuate the powder inlet valve and/or powder outlet valve of the dense phase powder pump is further provided in preferential embodiments of the inventive solution. The control unit is preferably further designed to alternatingly apply a negative pressure and an excess pressure in the (single) powder conveyor chamber of the dense phase powder pump.

A gas path is preferably designated for the (single) powder conveyor chamber of the dense phase powder pump via which the powder conveyor chamber can be alternatingly connected to a vacuum line or vacuum source for suctioning coating powder into the powder conveyor chamber through the open powder inlet valve while the powder outlet valve is closed or to a compressed air line or compressed air source for pneumatically expelling a portion of powder present in the powder conveyor chamber through the open powder outlet valve while the powder inlet valve is closed. The control unit is thereby designed to alternatingly switch the single powder conveyor chamber between suctioning and discharging of powder.

In preferential embodiments of the inventive dense phase powder pump, the previously cited gas path comprises a suction air opening and a compressed air opening in a circumferential housing wall of the powder conveyor chamber, whereby a microporous filter element, preferably in the form of a filter tube, is preferably further provided, which forms the circumferential wall of the powder conveyor chamber at least for a part of the length or preferably the entire length of the powder conveyor chamber and separates the powder chamber from an annular chamber. The annular chamber is formed between the outer circumference of the filter element preferably configured as a filter tube and the inner circumference of the housing circumferential wall and surrounds the filter element preferably configured as a filter tube.

Because of its small pore size, the filter element preferably configured as a filter tube is permeable to air but not, however, to coating powder. It is preferably composed of a sintered material.

In embodiments in which the powder inlet and powder outlet of the single powder conveyor chamber are disposed on opposite end regions of the powder conveyor chamber, it is advantageous for the suction air opening to open into the annular chamber near the powder outlet and the compressed air opening to open into the annular chamber near the powder inlet.

It is however of course also conceivable to select one single (common) opening for both the suction air opening as well as the compressed air opening.

The powder inlet valve and the powder outlet valve of the (single) powder conveyor chamber provided in the inventive dense phase powder pump are each preferably designed as a pinch valve, particularly of the style having a flexible elastic tube as the valve channel, whereby the flexible elastic tube can be squeezed by means of actuating compressed air in a pressure chamber surrounding the tube to close the respective valve.

In conjunction hereto, it is particularly of advantage for the powder inlet valve designed as a pinch valve and the powder outlet valve designed as a pinch valve to each comprise a pinch valve housing having a powder inlet and a powder outlet as well as an elastically deformable valve element, preferably in shape of a tube section. The valve element within the interior of the pinch valve housing is thereby to be in particular designed such that the powder inlet of the pinch valve can be brought into fluidic connection with the powder outlet of the pinch valve by means of the valve element formed as a tube section.

It is hereby advantageous for the pinch valve housing to comprise at least one connection for supplying compressed air (actuating compressed air) as needed into the space formed between the inner wall of the pinch valve housing and the valve element arranged in the interior of the pinch valve housing. Supplying actuating compressed air generates an excess pressure in the space between the inner wall of the pinch valve housing and the valve element, in consequence of which the valve element is radially squeezed and the pinch valve closed. When the pressure is subsequently relieved in the pinch valve housing, the valve element again returns to its in initial state such that there is a fluidic connection between the powder inlet of the pinch valve and the outlet of the pinch valve by way of said valve element.

In conjunction hereto, it is further conceivable for the pinch valve housing to comprise at least one connection for the application of a negative pressure as needed within the pinch valve housing in order to thereby reduce the amount of time the pinch valve is open.

The amount of powder which the inventive dense phase powder pump is able to convey per unit of time is dependent on several parameters, particularly the size (volume) of the powder conveyor chamber, the frequency at which coating powder is suctioned into the powder conveyor chamber and then discharged again, the magnitude (amount) of vacuum applied to suction the coating powder into the powder conveyor chamber, the length of time the powder inlet valve is open during the suction phase as well as the flow resistances in the powder lines upstream and particularly downstream of the dense phase powder pump. The flow resistances in the powder lines upstream and particularly downstream of the dense phase powder pump are in particular dependent on the length and the internal cross section of the powder lines, usually powder tubes.

The conveying frequency of the dense phase powder pump depends primarily on the frequency at which coating powder is suctioned into the powder conveyor chamber and then is or can be expelled again.

In order for the dense phase powder pump according to the invention and configured as a single-chamber dense phase powder pump which has only one single powder conveyor chamber to be able to prevent or at least reduce pulsations in the dispensed flow of powder at the powder outlet of the dense phase powder pump, the dense phase powder pump is of structural design in preferential realizations of the invention so as to enable a corresponding shortening of the response time for switching from a suction phase, during which the powder conveyor chamber of the single-chamber dense phase powder pump is connected to a vacuum source, to a discharge phase, during which the powder conveyor chamber of the single-chamber dense phase powder pump is connected to a compressed air source or conveying compressed air source respectively, so as to ultimately increase the conveying frequency of the dense phase powder pump.

Provided hereto according to one aspect of the invention is a negative pressure being applied in the powder conveyor chamber during the suction phase at the earliest simultaneously or preferably after a specific delay period following a control signal opening the powder inlet valve arranged on the powder inlet of the powder conveyor chamber such that the negative pressure in the powder conveyor chamber begins to build at the earliest simultaneously to the opening of the powder inlet valve, but preferably after the cited predetermined delay period following the opening of the powder inlet valve. The predetermined delay period is preferably in a range between 0 ms and 50 ms in the case of a conveyor chamber conveying cycle (=pump cycle of the dense phase powder pump) of approximately 200 ms. This example does not, however, exclude the use other delay periods and cycle times for the dense phase powder pump.

Because the powder conveyor chamber in advantageous realizations of the inventive solution is not subjected to negative pressure during the suction phase of the dense phase powder pump until the powder inlet valve is already open, or at the earliest simultaneously with the opening of the powder inlet valve respectively, this enables the negative pressure in the powder conveyor chamber to less strongly counteract the opening motion of the powder inlet valve, particularly when it is implemented as a pinch valve, at least at the time the opening motion of the powder inlet valve begins, compared to the known prior art solutions implemented as multi-chamber dense phase powder pumps.

To shorten the response time of the inventive dense phase powder pump and thus increase its conveying frequency, it is provided additionally or alternatively to the previously cited measures for both the powder inlet valve provided at the powder inlet of the powder conveyor chamber as well as the powder outlet valve provided at the powder outlet of the powder conveyor chamber to be designed as a pneumatically controllable pinch valve. Corresponding control valves which supply actuating compressed air to the pinch valves in coordinated manner are used to actuate the pinch valves.

In accordance with preferential embodiments of the dense phase powder pump according to the invention, it is provided for the length of the pneumatic control lines to the pinch valves to be shortened to the greatest possible extent so as to minimize the response delay periods upon the actuating of the respective pinch valves; i.e. upon actuating compressed air being supplied and/or upon negative pressure being applied or the ventilating of the respective pinch valve housings.

To this end, preferential embodiments of the inventive dense phase powder pump provide for example for a material block, preferably consisting of a plurality of modules, in which the single powder conveyor chamber of the dense phase powder pump is formed or on which the single powder conveyor chamber of the dense phase powder pump is arranged, wherein the powder inlet valve and the powder outlet valve of the single powder conveyor chamber of the dense phase powder pump is advantageously likewise arranged on this material block. The respective control valves serving to pneumatically actuate the powder inlet and powder outlet valve preferably implemented as pinch valves are thereby in particular fluidly connected directly to the powder inlet valve/powder outlet valve via compressed air channels formed in the material block so as to enable the supply and removal of actuating air to the powder inlet/outlet valve designed as a pinch valve.

In conjunction hereto, it is advantageous for all the control valves which are fluidly coupled to the (single) powder conveyor chamber of the inventive dense phase powder pump for the supplying of conveying compressed air (during the discharge phase of the dense phase powder pump) and vacuum (during the suction phase of the dense phase powder pump) to be disposed on the material block and fluidly coupled to the single powder conveyor chamber directly by means of channels formed in said material block.

These measures achieve being able to shorten to the greatest extent possible the length of the pneumatic control lines to the pinch valves and the length of the air lines to the powder conveyor chamber so as to thereby achieve being able to minimize the response delay periods upon the actuating of the respective pinch valves; i.e. upon actuating compressed air being supplied and/or upon negative pressure being applied or the ventilating of the respective pinch valve housings.

As stated above, the response time of the inventive dense phase powder pump can be shortened, and thus the conveying frequency increased, by ensuring that during the dense phase powder pump's suction phase; i.e. when a negative pressure is applied in the powder conveyor chamber, the opening of the powder inlet valve arranged on the powder inlet of the powder conveyor chamber begins, at the earliest, simultaneously thereto. Alternatively or additionally hereto, the pump frequency can thereby be increased by on the whole shortening to the greatest extent possible the channels for the supply/discharge of actuating compressed air to the pinch valves for the pneumatic actuation of the powder inlet valve designed as a pinch valve or respectively the powder outlet valve designed as a pinch valve.

It is additionally of advantage hereto to shorten the channel path lengths, respectively the channel for supplying the conveying compressed air to the single powder conveyor chamber, and/or the channel path lengths, respectively the channel for applying a vacuum in the powder conveyor chamber. Doing so can reduce the response delay periods when the powder inlet valve and/or the powder outlet valve is/are being actuated and when a vacuum is being applied in the suction phase, or an excess pressure during the discharge phase respectively, in the single powder conveyor chamber.

Accordingly increasing the conveying frequency of the dense phase powder pump ensures a sufficient homogeneity to the flow of powder dispensed at the powder outlet of the dense phase powder pump.

To increase the homogeneity to the powder flow at the powder outlet of the dense phase powder pump even further, and particularly to prevent disruptive pulsing from occurring in the powder flow downstream of the powder outlet of the dense phase powder pump, preferential realizations of the inventive solution make use of an auxiliary compressed air inlet device additionally or alternatively to the previously cited measures. This auxiliary compressed air inlet device discharges into the powder path in at least one location between the powder outlet valve allocated to the single powder conveyor chamber and the powder outlet of the dense phase powder pump or preferably directly downstream of the powder outlet of the dense phase powder pump and serves to supply auxiliary compressed air serving as additional conveying compressed air as needed. In other words, additionally to the conveying compressed air introduced into the powder conveyor chamber during the discharge phase of the dense phase powder pump, the auxiliary compressed air inlet device supplies additional conveying compressed air directly before or after the powder outlet of the dense phase powder pump at the appropriate times and/or upon appropriate events.

A filter tube is preferentially provided to realize the at least one auxiliary compressed air inlet device through which the powder path between the powder outlet valve and the powder outlet of the dense phase powder pump runs at least in part. Preferably, a section of the powder path length downstream of the powder outlet valve of the dense phase powder pump is led through the filter tube. The filter tube is permeable to compressed air but not to coating powder particles. Forming the filter tube from microporous material, such as e.g. sintered material, is useful hereto. The filter tube forms a circumferential wall around the powder path and thus a relatively large surface by means of which small volumes of auxiliary compressed air can already flow homogeneously through the filter tube into the powder path and be able to affect powder particles in the sense of homogenizing the powder concentration.

It is particularly advantageous in conjunction hereto for the filter tube to have a circumference of at least 180° and form a channel wall inner surface over at least 180° of the powder path circumference.

It is however of course also possible for the auxiliary compressed air inlet device to be designed without a filter element, a filter tube in particular. The filter element or filter tube only serves to prevent powder particles from being able to infiltrate into an auxiliary compressed air line connected to the auxiliary compressed air inlet device.

So as to be able to particularly effectively reduce or prevent flow pulsations in the powder path downstream of the powder outlet of the dense phase powder pump, it is advantageous for the auxiliary compressed air inlet device to introduce auxiliary compressed air preferably in pulses into the powder path after the powder outlet valve of the dense phase powder pump. The pulse frequency of the auxiliary compressed air should hereby be at least equal to the powder conveyor chamber frequency at which portions of powder are dispensed from said powder conveyor chamber.

In accordance with preferential realizations of the inventive dense phase powder pump, it is provided for the pulse frequency of the auxiliary compressed air to be at least equal to the powder conveyor chamber frequency; i.e. the frequency at which portions of powder are dispensed from said powder conveyor chamber. In conjunction hereto, it is expedient for a mechanism to be provided to supply auxiliary compressed air to the at least one auxiliary compressed air inlet device, wherein said mechanism for supplying auxiliary compressed air is advantageously designed so as to supply the auxiliary compressed air to the at least one auxiliary compressed air inlet device in phase opposition relative to the powder discharge cycle of the powder conveyor chamber. Doing so achieves the auxiliary compressed air always being fed into the powder path after the powder outlet valve when the powder outlet valve is closed. This measure in particular enables a constant value to the flow rate in the powder line downstream of the powder outlet of the dense phase powder pump without any fluctuations.

In conjunction hereto, it is of particular advantage to provide for a compressed air source which continuously supplies compressed air to the dense phase powder pump for the operation of said dense phase powder pump, wherein a distributor for example in the form of a three-way valve or the like is provided to alternatingly supply the powder conveyor chamber and the auxiliary compressed air inlet device with the compressed air continuously dispensed by the compressed air source.

Preferential embodiments of the inventive solution provide for the single powder conveyor chamber of the dense phase powder pump to comprise at least one air exchange vent via which the powder conveyor chamber can be intermittently subjected to conveying compressed air for the expelling of powder portions from the powder conveyor chamber during the discharge phase. Further provided in a particularly simple to realize yet effective manner is for the mechanism for supplying auxiliary compressed air to the at least one auxiliary compressed air inlet device to comprise a control element, particularly a three/two-way valve or similar control valve via which compressed air from a common compressed air source can be alternatingly supplied to the at least one air exchange vent of the powder conveyor chamber or the at least one auxiliary compressed air inlet device. Providing such a control element, via which the powder conveyor chamber and the auxiliary compressed air inlet device can be alternatingly fluidly connected to a common compressed air source, can effectively realize at any time either conveying compressed air or auxiliary compressed air being supplied to the dense phase powder pump and fed into the powder path in a particularly simple to realize manner.

Conceivable in this context is designing the mechanism for supplying auxiliary compressed air to the at least one auxiliary compressed air inlet device such that the amount of auxiliary compressed air supplied to the at least one auxiliary compressed air inlet device per pump cycle can be set particularly as a function of the amount of conveying compressed air supplied to the at least one air exchange vent of the powder conveyor chamber per pump cycle. It is hereby particularly of advantage for the mechanism for supplying auxiliary compressed air to the at least one auxiliary compressed air inlet device to be designed to set the amount of auxiliary compressed air supplied to the at least one auxiliary compressed air inlet device per pump cycle such that the amount of auxiliary compressed air fed into the powder path per pump cycle via the at least one auxiliary compressed air inlet device is substantially equivalent to the amount of conveying compressed air fed into the powder conveyor chamber via the at least one air exchange vent per pump cycle.

In conjunction hereto, "substantially equivalent" means that the amount of auxiliary compressed air supplied per pump cycle deviates by no more than 15% from the amount of conveying compressed air fed per pump cycle into the powder path or into the powder conveyor chamber respectively. The lower the deviation the more uniformly the flow rate of the powder/air mixture can be set in the powder line downstream of the powder outlet of the dense phase powder pump.

The present invention is in particular based on the realization that it is of advantage in the case of a dense phase powder pump designed as a single-chamber dense phase powder pump for auxiliary compressed air to be supplied as additional conveying compressed air at the powder outlet of the dense phase powder pump, whereby the powder/air mixture flows through the powder line downstream of the powder outlet of the dense phase powder pump that much more homogeneously when the amount of auxiliary compressed air fed into the powder path downstream of the powder outlet during the suction phase of the powder conveyor chamber is of substantially the same volume as the amount of conveying compressed air fed into the powder conveyor chamber during the powder discharge phase which serves in pneumatically expelling the portion of powder previously suctioned into the powder conveyor chamber.

In order to realize this finding in the dense phase powder pump according to the invention, it is on one hand conceivable to provide a mechanism for supplying auxiliary compressed air to the at least one auxiliary compressed air inlet device, wherein this mechanism adapts the volume of auxiliary compressed air fed into the powder path to the volume of conveying compressed air fed into the powder conveyor chamber.

A complex compressed air volume control can however be dispensed with when the pneumatic resistances occurring when conveying compressed air is fed into the powder conveyor chamber and when auxiliary compressed air is fed into the powder path are of substantially the same value. In order to achieve this, it is advantageous for at least the essential components of the auxiliary compressed air inlet device; i.e. the components needed for the supplying of the auxiliary compressed air into the powder path, to have the same structure as the essential components of the powder conveyor chamber; i.e. the powder conveyor chamber components needed in the supplying of the conveying compressed air during the discharge phase of the powder conveyor chamber. It is for example conceivable in this context for the auxiliary compressed air inlet device to comprise a chamber wall, at least part of its length formed by a filter, which surrounds the powder path and separates it from an intermediate chamber surrounding the filter and formed between the filter and a housing of the auxiliary compressed air inlet device. At least the filter of the auxiliary compressed air inlet device is hereby to be structurally identical to the filter of the powder conveyor chamber.

On the other hand, it is further conceivable for a control unit to be provided by means of which the auxiliary compressed air frequency can be preferably automatically adjusted, preferably automatically controlled or regulated, as a function of the powder discharge frequency of the powder conveyor chamber. Particularly the adapting of the pulse frequency of the auxiliary compressed air to the frequency of the powder conveyor chamber, whereby the auxiliary compressed air is then advantageously always fed into the powder path after the powder outlet valve of the dense phase powder pump when the dense phase powder pump is in its suction phase, in which the powder inlet valve is open and the powder outlet valve is closed, ensures that a sufficient volume of conveying compressed air as required to convey the coating powder is always employed.

It is however of course also conceivable for auxiliary compressed air to be additionally introduced into the powder path after the powder outlet valve of the dense phase powder pump during the discharge phase of the dense phase powder pump.

However, only feeding auxiliary compressed air into the powder path by means of the auxiliary compressed air inlet device when the dense phase powder pump is in its suction phase allows reducing the resources (compressed air and thus energy) needed to operate the dense phase powder pump. Doing so in particular also prevents there from being too much conveying compressed air in the powder path downstream of the powder outlet of the dense phase powder pump so as to prevent powder particles from being expelled from the spray at the device (powder spray-coating gun or similar mechanism for spraying coating powder) disposed downstream of the dense phase powder pump.

In conjunction hereto, it is particularly advantageous for the amount of auxiliary compressed air flowing through the auxiliary compressed air inlet device per unit of time, which is introduced into the powder path after the powder outlet valve of the dense phase powder pump, to be able to be adjusted, preferably automatically controlled or regulated, as a function of the total amount of powder conveyed per unit of time by means of a control unit.

The invention is not only directed toward a dense phase powder pump designed as a single-chamber dense phase powder pump and only comprising a single powder conveyor chamber for conveying coating powder but also toward a powder spray-coating mechanism for spray coating objects with coating powder, wherein the powder spray-coating mechanism comprises a dense phase powder pump of the type described above as well as at least one spray-coating gun of preferably automatic and manual design. The spray-coating gun comprises a coating powder inlet connected or connectable to the powder outlet of the dense phase powder pump via a powder line.

With respect to the method for conveying coating powder from a first powder reservoir to a second powder reservoir arranged downstream of the first powder reservoir or to a powder spray-coating gun or similar mechanism for spraying coating powder arranged downstream of the first powder reservoir, the invention provides for the method to comprise the method step of providing a powder spray-coating mechanism of the type described above, thus comprising the inventive dense phase powder pump as well as at least one spray-coating gun, and the method step of realizing a specific operating cycle, wherein the specific operating cycle encompasses the following cycle steps:

a) generating a negative pressure in the single powder conveyor chamber of the dense phase powder pump for suctioning coating powder into the powder conveyor chamber through an opened powder inlet valve of the dense phase powder pump while the powder outlet valve of the dense phase powder pump is closed;
b) closing the powder inlet valve and opening the powder outlet valve;
c) introducing compressed gas into the powder conveyor chamber to discharge the coating powder from the powder conveyor chamber through the open powder outlet valve while the powder inlet valve is closed; and
d) closing the powder outlet valve and opening the powder inlet valve.

The method inventively provides for auxiliary compressed air to be fed at least into at least one location in the powder path after the powder outlet valve as additional conveying compressed air in cycle step a) or when changing from cycle step d) to cycle step a).

The auxiliary compressed air is preferably fed into the powder path in the inventive method in a manner as described above in conjunction with the dense phase powder pump.

BRIEF DESCRIPTION OF THE DRAWINGS

The following will reference the accompanying drawings in describing the invention in greater detail by way of example embodiments of the inventive dense phase powder pump.

The figures show.

DETAILED DESCRIPTION

The following will reference the representations provided in FIGS. 1-3, 6 and 7 in describing example embodiments of the dense phase powder pump 1 according to the invention.

Figure 4:
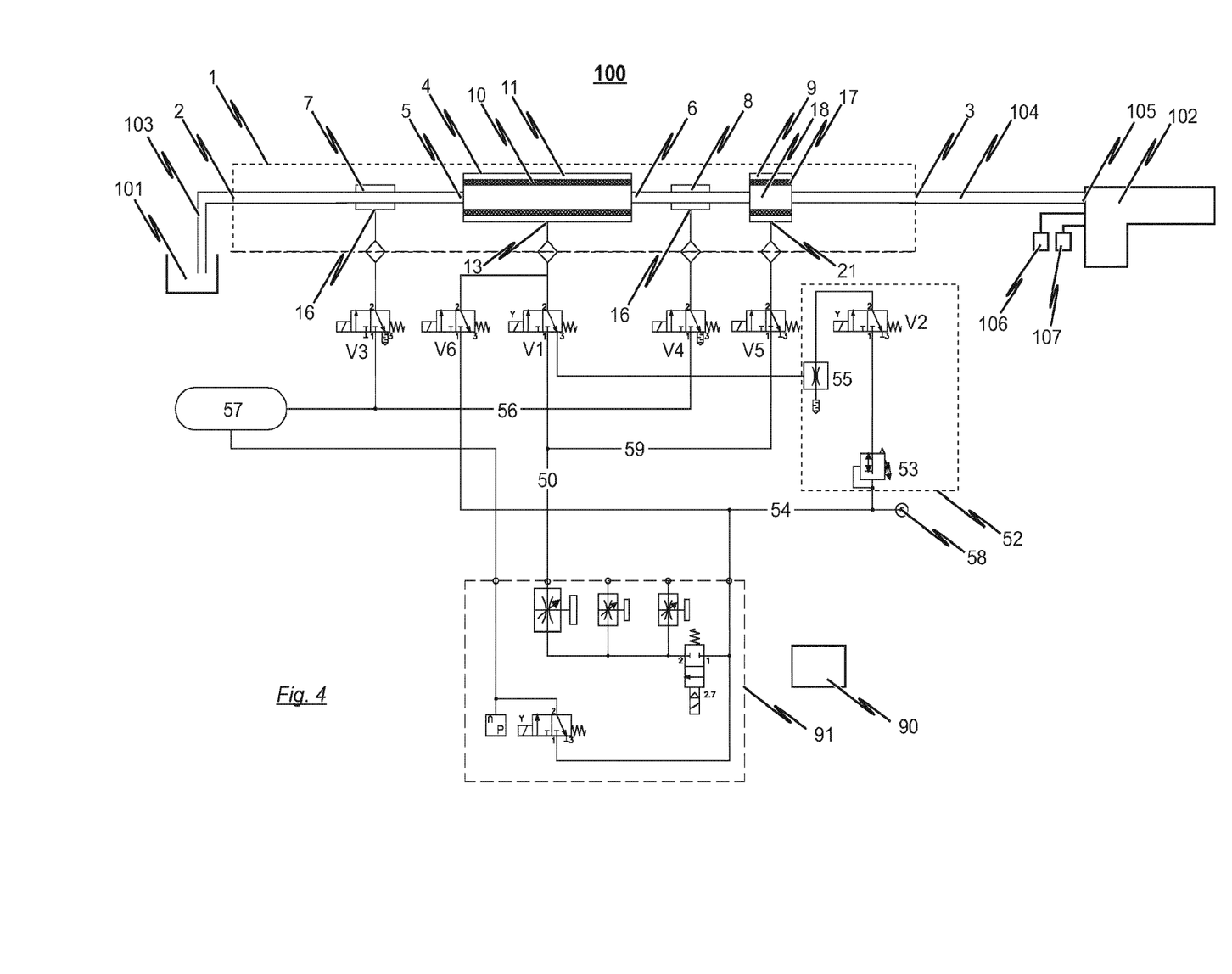
FIG. 4: a schematic representation of a first example embodiment of a powder spray-coating mechanism employing a dense phase powder pump according to the present invention.
Figure 5:
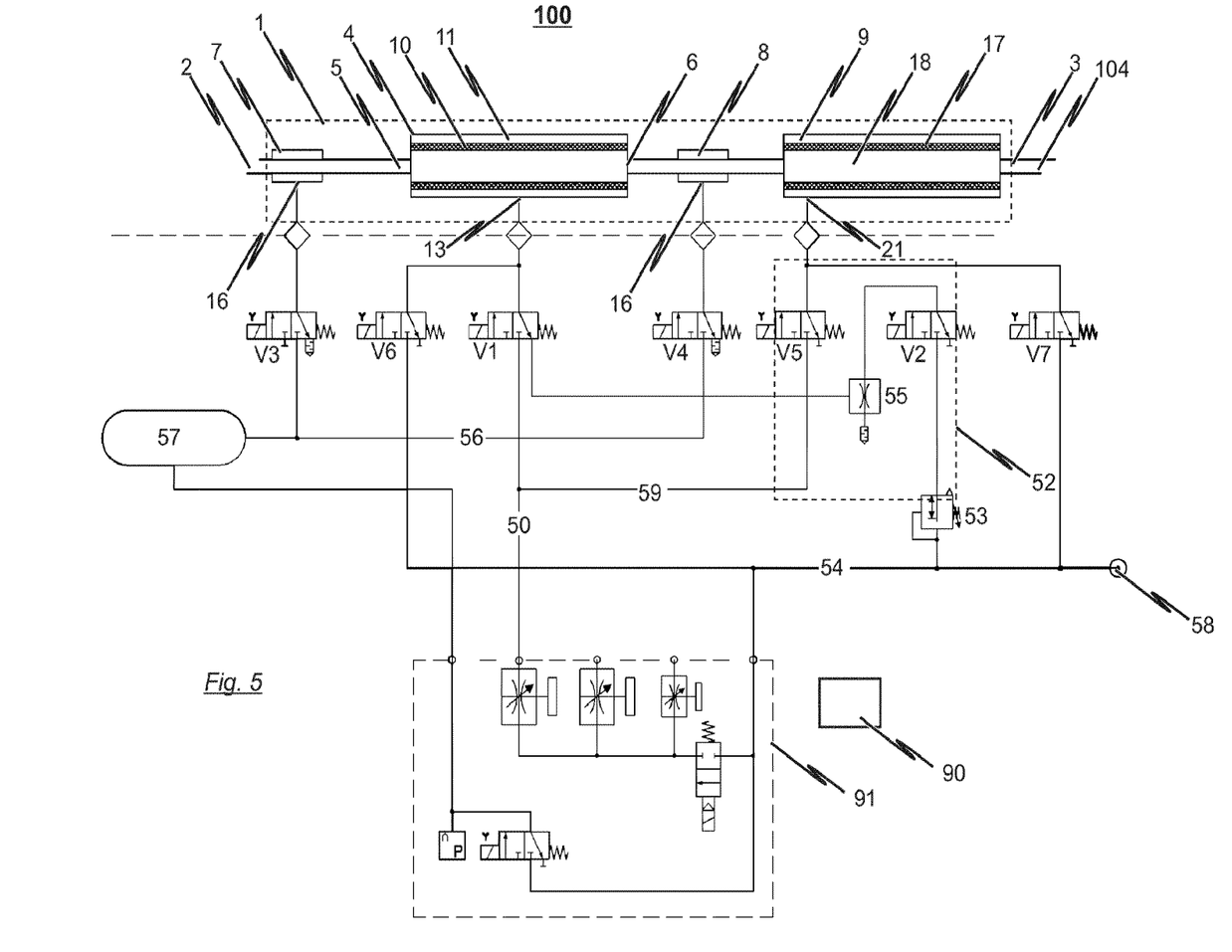
FIG. 5: a schematic representation of a second example embodiment of a powder spray-coating mechanism employing a dense phase powder pump according to the present invention.

FIGS. 4 and 5 schematically depict the powder spray-coating devices 100 in which embodiments of the inventive dense phase powder pump 1 are used to convey coating powder from a first powder reservoir 101 to a powder spray-coating gun 102 arranged downstream of the dense phase powder pump 1. Another mechanism for spraying coating powder onto an object to be coated or a second powder reservoir can also be used in place of powder spray-coating gun 102.

As FIG. 4 shows, the example embodiment of the inventive dense phase powder pump 1 used therein comprises a powder inlet 2 fluidly connected or connectable to the first powder reservoir 101 by means of a powder line 103, particularly by means of a suction tube or the like. A powder outlet 3 is provided on the opposite end region of the dense phase powder pump 1, which is connected or connectable to a coating powder inlet 105 of the powder spray-coating gun 102 by means of a powder line 104, particularly by means of a powder tube.

Figure 1:
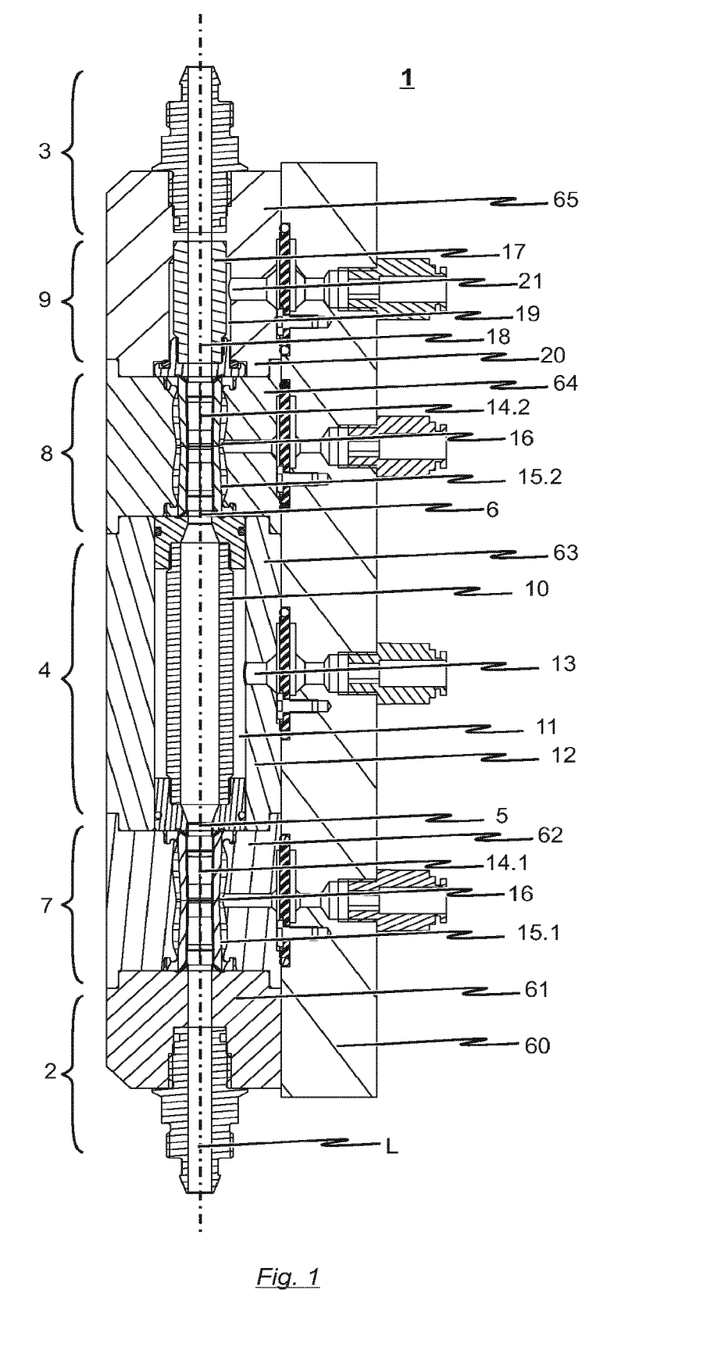
FIG. 1: a longitudinal sectional representation along the powder path through a first example embodiment of the dense phase powder pump according to the invention.
Figure 2:
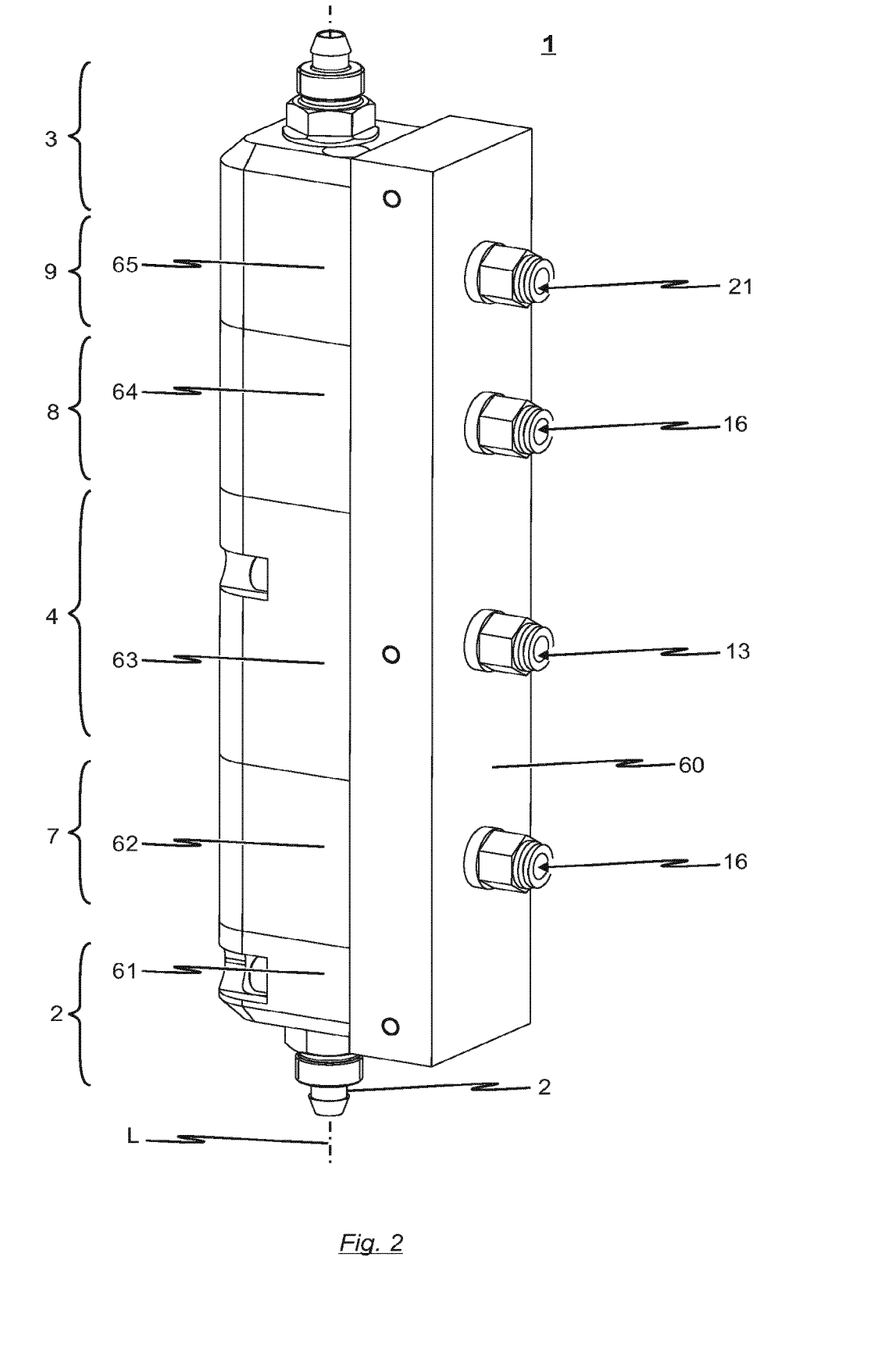
FIG. 2: a perspective view of the first example embodiment of the inventive dense phase powder pump according to FIG. 1.
Figure 3:
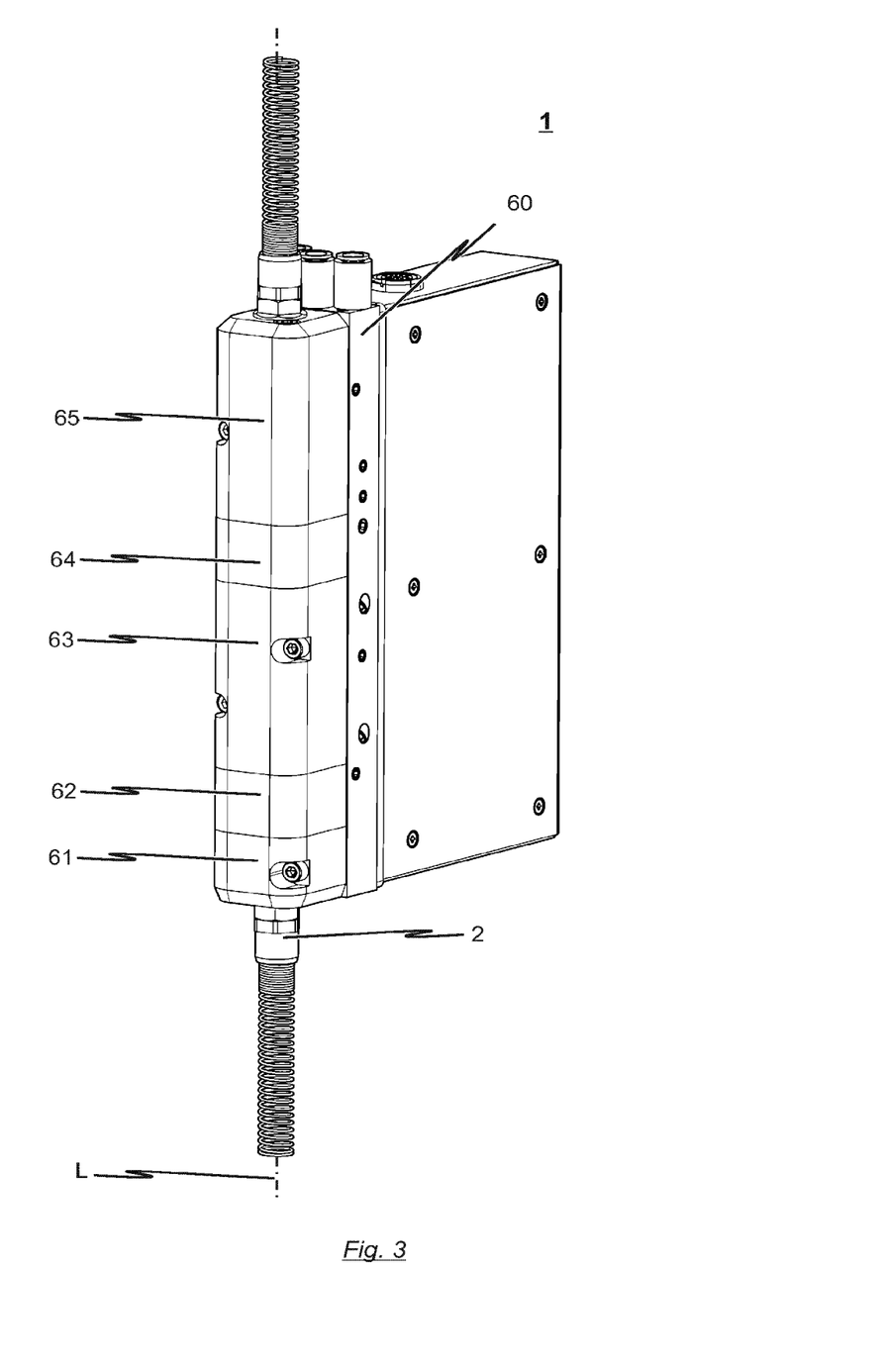
FIG. 3: a perspective view of a second example embodiment of the inventive dense phase powder pump.

Specifically, and as can be noted particularly from the FIGS. 1 to 3 representations, both the powder inlet 2 as well as the powder outlet 3 of the dense phase powder pump 1 in the first and second example embodiment are formed as respective hose connectors able to be fit onto the respective powder line 103/104 and fixed with a hose clip. However, other embodiments for the powder inlet 2 and/or powder outlet 3 are of course also conceivable.

The dense phase powder pump 1 according to the invention is characterized by being designed as a single-chamber dense phase powder pump, wherein only one single powder conveyor chamber 4 is provided for conveying coating powder from the first powder reservoir 101 to the powder spray-coating gun 102 or another mechanism for spray coating objects or to another powder reservoir.

In the example embodiments of the inventive dense phase powder pump 1 according to FIGS. 1 to 5, the (single) powder conveyor chamber 4 has a powder inlet 5 pointing toward the powder inlet 2 of the dense phase powder pump 1 at a first end region. The powder conveyor chamber 4 further has a powder outlet 6 pointing toward the powder outlet 3 of the dense phase powder pump 1. A powder inlet valve 7 is arranged directly adjacent the powder inlet 5 of the powder conveying chamber 4, and in a manner such that this powder inlet valve 7 is situated between the powder inlet 5 of the powder conveyor chamber 4 and the powder inlet 2 of the dense phase powder pump 1. A powder outlet valve 8 is similarly arranged directly adjacent the powder outlet 6 of the powder conveyor chamber 4.

In contrast to the powder inlet region of the dense phase powder pump 1, however, the powder outlet valve 8 is not arranged directly between the powder outlet 6 of the powder conveyor chamber and the powder outlet 3 of the dense phase powder pump 1 in the powder outlet region of the dense phase powder pump 1; instead, an auxiliary compressed air inlet device 9 is arranged between the powder outlet valve 8 and the powder outlet 3 of the dense phase powder pump 1. As will be further described below, this auxiliary compressed air inlet device 9 serves to feed additional conveying compressed air into the powder path between the powder outlet valve 8 and the powder outlet 3 of the dense phase powder pump 1 when needed.

It is to be noted at this point that it is not imperative for the auxiliary compressed air inlet device 9 to be arranged between the powder outlet valve 8 and the powder outlet 3 of the dense phase powder pump 1. The effects achievable with the auxiliary compressed air inlet device 9, which will be described in greater detail below, can also be realized when the auxiliary compressed air inlet device 9 is arranged behind the powder outlet 3 of the dense phase powder pump 1.

Although not shown in the drawings, a further valve, particularly a pinch valve, is provided between the auxiliary compressed air inlet device 9 and the powder outlet 3 of the dense phase powder pump 1 in advantageous realizations of the inventive dense phase powder pump 1 which, as it is arranged directly at the powder outlet 3 of the dense phase powder pump 1, then assumes the function of the powder outlet valve.

As can be seen particularly from the FIG. 1 representation, the powder inlet 2 of the dense phase powder pump 1, the powder inlet valve 7, the powder inlet 5 of the powder conveyor chamber 4, the powder conveyor chamber 4, the powder outlet 6 of the powder conveyor chamber 4, the auxiliary compressed air inlet device 9 as well as the powder outlet 3 of the dense phase powder pump 1 all lie along a common longitudinal axis L. In other words, the powder inlet 2 of the dense phase powder pump 1 is disposed at the opposite end from the powder outlet 3 of the dense phase powder pump 1.

The following will describe in greater detail the structure and functioning of particularly the single powder conveyor chamber 4 of the example embodiment of the dense phase powder pump 1 depicted in the drawings.

As can be noted from the longitudinal sectional view of FIG. 1 or the schematic depiction of FIG. 3, the powder conveyor chamber 4 is formed between its powder inlet 5 and its powder outlet 6 by the cylindrical wall of a tubular filter 10 which is permeable to air but not, however, to coating powder and can be made for example from sintered material. The filter 10 configured as a filter tube is surrounded by an intermediate chamber 11, its exterior limited by a housing 12 of the powder conveyor chamber 4.

An air exchange vent 13 fluidly coupled to a control valve V1 leads through the housing 12 (see FIG. 3). The control valve V1 can alternatingly supply the powder conveyor chamber 4 with conveying compressed air from a compressed air supply line 50 or apply a vacuum or negative pressure from a vacuum source 52.

In the embodiments of the inventive powder spray-coating device 100 depicted schematically in FIGS. 4 and 5, the vacuum source 52 comprises an injector 55 which is supplied with injector compressed air from a compressed air supply line 54, a compressed air source 58 respectively, for example by way of a pressure regulator 53 and a further control valve V2.

In order for coating powder to be able to be suctioned from the first powder reservoir 101 into the powder conveyor chamber 4 via the powder inlet 2 of the dense phase powder pump 1 during a suction phase of the dense phase powder pump 1, the powder outlet valve 6 arranged at the powder outlet 6 of the powder conveyor chamber 4 is closed and the powder inlet valve 7 arranged between the powder inlet 2 of the dense phase powder pump 1 and the powder inlet 5 of the powder conveyor chamber 4 is open. At the same time that the powder outlet valve 8 and the powder inlet valve 7 are actuated, or immediately thereafter, the powder conveyor chamber 4 is connected to the vacuum source 52 by means of control valve V1 and the thereby connected air exchange vent 13, so that the powder conveyor chamber 4 is subjected to a negative pressure and coating powder can be suctioned out of the first powder reservoir 101.

After the coating powder has been suctioned into the powder conveyor chamber 4, a change occurs from the suction phase to the phase of discharging coating powder from the conveyor chamber 4. To this end, the powder inlet valve 7 is closed and the powder outlet valve 8 opened while the control valve V1 fluidly connects the air exchange vent 13 and the compressed air supply line 50 so that the portion of coating powder previously suctioned into the powder conveyor chamber 4 during the suction phase is expelled through the open powder outlet valve 8 by means of the conveying compressed air supplied via the air exchange vent 13.

The operating phase of suctioning coating powder via the powder inlet 2 of the dense phase powder pump 1 and via the open powder inlet valve 7 occurs again thereafter. This change of operating phases is repeated continuously.

The term "pump cycle" as used herein is to be understood as one cycle consisting of a suction phase and a discharge phase.

The valves disposed at the intake and discharge side of the powder conveyor chamber 4 (powder inlet valve 7, powder outlet valve 8) are preferably designed as pinch valves, whereby different types of valves are however also generally conceivable.

The powder inlet and powder outlet valves 7, 8 respectively configured as pinch valves in the example embodiment depicted in the drawings each comprise a flexible elastic tube 14.1, 14.2 serving as the valve channel. Actuating compressed air in a pressure chamber 15.1, 15.2 surrounding the flexible elastic tube 14.1, 14.2 can squeeze the flexible elastic tube 14.1, 14.2 in order to close the respective valve (powder inlet valve 7, powder outlet valve 8).

To this end, a respective air exchange vent 16 connected to a respective control valve V3, V4 is provided in each pressure chamber 15.1, 15.2. The control valves V3, V4 serve to alternatingly subject the pressure chambers 15.1, 15.2 of the two powder inlet/powder outlet valves 7, 8 respectively designed as pinch valves to excess pressure from a compressed air supply line 56.

As depicted, the compressed air supply line 56 is connected to a pressure storage unit 57, wherein the pressure storage unit 57 is itself connected to a compressed air source 58. It is however of course also conceivable for the compressed air supply line 56 to be connected directly to the compressed air source 58 (i.e. without the interposition of a pressure storage unit 57).

The flexible, elastic tube 14.1, 14.2 of the powder inlet valve 7 and/or powder outlet valve 8 designed as pinch valves preferably has such an elasticity or inherent tension that it automatically expands again after the pressure of the actuating compressed air in the pressure chamber 15.1, 15.2 ceases, with the respective valve channel thereby opening. In order to support the opening of the pinch valve and thus increase the switching frequency able to be realized with the dense phase powder pump 1, it is conceivable for a negative pressure to be applied via the corresponding air exchange vents 16.

The inventive solution provides for different measures for the inventive single-chamber dense phase powder pump to achieve a homogeneous flow of powder downstream of the powder outlet 3 of the dense phase powder pump without disruptive pulsing.

For example, the dense phase powder pump 1 is structurally designed and configured in such a manner that the pumping frequency which the dense phase powder pump 1 is able to achieve can be increased compared to the pump frequency achievable with conventional multi-chamber dense phase powder pumps. To this end, in advantageous realizations of the inventive dense phase powder pump 1, the inventive solution makes use of a material block 60 to which the powder inlet valve 7 required for the conveying of coating powder as well as the powder outlet valve 8 likewise required for the conveying of coating powder including the control valves V3, V4 required in actuating the valves 7, 8 can be affixed (not explicitly shown in the drawings). Both the powder inlet valve 7 as well as the powder outlet valve 8 and the control valves V3, V4 required for the actuation are preferably connected to channels formed in the material block 60 (not shown in the figures). The same also applies to control valve V1 which is fluidly coupled to the air exchange vent 13 of the powder conveyor chamber 4 by means of at least one channel formed in the one-piece material block 60.

Arranging the respective control valves V1, V3 and V4 as well as the powder inlet and powder outlet valve 7, 8 as closely as possible to the components of the dense phase powder pump 1 to be operated in example embodiments of the dense phase powder pump 1 according to the invention prevents the occurrence of large volumes in the corresponding pressure lines to the pneumatically actuated valves 7, 8 or the corresponding pressure line to the air exchange vent 13 of the powder conveyor chamber 4 which would either have to be selectively evacuated or filled with compressed air in the alternating operation of the dense phase powder pump 1. This can thus prevent excessive response delay times, which ultimately would also limit the frequency at which the dense phase powder pump 1 could convey coating powder.

As can in particular be noted from the FIGS. 1 and 2 representations, the inventive dense phase powder pump 1 advantageously exhibits a modular structure in which the "powder inlet 2 of the dense phase powder pump 1," "powder inlet valve 7," "powder conveyor chamber 4," "powder outlet valve 8" and "auxiliary compressed air inlet device 9" components together with "powder outlet 3 of the dense phase powder pump 1" are each designed as modular elements. In the drawings, the module which forms the powder inlet 2 of the dense phase powder pump 1 is identified by reference numeral "61" while module 62 arranged downstream thereof constitutes the powder inlet valve 7. Modules 63 and 64 form the powder conveyor chamber 4 and the powder outlet valve 8 while module 65 forms the combination of auxiliary compressed air inlet device 9 and powder outlet 3 of the dense phase powder pump 1. The individual modules 61, 62, 63, 64 and 65 are axially arranged relative to the common longitudinal axis L and mounted on the material block 60 one after the other.

The modular structure to the dense phase powder pump 1 considerably simplifies the maintenance of the pump since the pump's individual modules 61, 62, 63, 64 and 65 can be particularly easily and particularly quickly replaced by respective other components when needed, for example in case of failure or for the purpose of servicing and/or cleaning.

Using a total of only two powder valves preferably configured as pinch valves (powder inlet valve 7 and powder outlet valve 8) in the inventive dense phase powder pump 1 significantly reduces the pump's susceptibility to failures compared to conventional multi-chamber dense phase powder pumps in which at least four powder valves and a correspondingly higher number of control valves for controlling the powder valves need to be employed. In particular, the number of parts subject to wear is reduced to a minimum in the inventive dense phase powder pump 1 such that the settings of the dense phase powder pump 1 require significantly less frequent adjusting due to expendable parts and high reproducibility of the pump's settings is ensured.

The single-chamber design of the inventive dense phase powder pump 1 moreover allows a particularly compact structure to the pump. For example, in the case of a dense phase powder pump 1 having a pump length of approximately 250 mm, up to 400 g coating powder can thus be conveyed per minute (pump width: 40 mm).

In the example embodiments of the inventive dense phase powder pump 1 depicted in the drawings, the previously cited auxiliary compressed air inlet device 9 is however particularly provided to reduce or prevent pulsations downstream of the powder outlet 3 of the dense phase powder pump 1, same being provided at the outlet of the powder outlet valve 8, or powder outlet 3 of the dense phase powder pump 1 respectively, so as to be able to feed auxiliary conveying compressed air into the powder path at that point as needed.

In the implementations of the auxiliary compressed air inlet device 9 employed in the example embodiments of the inventive dense phase powder pump 1 depicted in the drawings, same comprises a filter tube 17 having a circumference of at least 180° (in the depicted embodiments, the circumference is 360°) and forming a channel wall inner surface over at least 180° (in the embodiments depicted in the drawings, the channel wall inner surface covers 360°) of the circumference of the powder path at least over part of the length of the corresponding powder path.

In other words, in the depicted embodiments of the dense phase powder pump 1 according to the invention, the auxiliary compressed air inlet device 9 has a filter tube 17 surrounding the corresponding powder path by 360° over at least part of its length so that the portion of powder expelled from the powder conveyor chamber 4 of the dense phase powder pump 1 during a powder discharge phase can flow homogeneously through the filter tube channel 18 formed by the filter tube 17.

A compressed air chamber 19 designed as an annular compressed air chamber in the embodiment depicted in the drawings surrounds the outer circumference of the filter tube 17. The radially inner circumference of the compressed air chamber 19 configured here as an annular compressed air chamber is surrounded by the filter tube 17 and its radially outer circumference by a housing 20 at a distance from the filter tube 17. An air exchange vent 21 is provided in the housing 20 via which compressed air can flow as needed from a compressed air line 59 into the compressed air chamber 19 by way of a control valve V5 and from there through the filter tube 17 into the filter tube channel 18.

Depending on the amount of auxiliary conveying compressed air to be fed into the powder path per unit of time, the compressed air chamber 19 and the filter tube channel 18 formed by the filter tube 17 are to be of correspondingly large-volume configuration.

As indicated above, the filter tube 17 of the auxiliary compressed air inlet device 9 is made of a microporous material so as to be permeable to air but not to coating powder. The filter tube 17 preferably consists of a sintered body, for example of metal or plastic, or of a material mixture containing metal or plastic. It can further consist of one material and/or be formed by a filter membrane.

The filter pores of the filter tube 17 are preferably designed such that compressed air is directed over a large powder path area both in the circumferential direction as well as in the longitudinal direction of the powder path. The micropores of the powder tube 17 can be radially or axially inclined toward the powder path and/or run from the filter tube 17 into the filter tube channel 18 tangentially to the powder path circumference and direct the compressed air accordingly. The large inner circumferential surface of the filter tube 17 can homogenize the axial distribution of powder in the filter tube channel 18 and thus also in the powder path downstream of the powder outlet 3 of the dense phase powder pump 1 with a small volume of compressed air. This can prevent or at least reduce pulses in the powder flow along the powder path. Homogenization of the powder density in the longitudinal direction and over the cross section of the powder path can furthermore be achieved.

The amount of conveying compressed air fed into the powder path per unit of time can be kept so low that it has no or only a small influence on the flow rate of the coating powder in the flow path. There is additionally the possibility of increasing the flow volume to influence the flow rate of the coating powder by increasing the pressure of the conveying compressed air additionally supplied by the auxiliary compressed air inlet device 9.

The compressed air additionally fed as needed into the powder path of the dense phase powder pump 1 by the auxiliary compressed air inlet device 9 can flow from the filter tube 17 into the filter tube channel 18 in the form of streams or in the form of small bubbles depending on the type of the filter pores and the air pressure.

The filter tube 17 of the auxiliary compressed air inlet device 9 is to extend around the powder path over at least 180° of the powder path circumference, preferably the full 360° of the powder path circumference.

The filter tube 17 of the auxiliary compressed air inlet device 9 is preferably a rigid body but can also be a flexible body.

In accordance with one preferential embodiment of the invention, the auxiliary compressed air of the auxiliary compressed air inlet device 9 is supplied in pulses at a pulse frequency which is equal to or preferably greater than the frequency of the powder conveyor chamber 4 at which the powder conveyor chamber 4 dispenses the portions of powder. The auxiliary compressed air inlet device 9 can be provided with a pulsating source of compressed air or a compressed air pulse generator for this purpose.

In accordance with a further advantageous embodiment of the invention, a control unit 90 is provided which is designed so as to be able to adjust the pulse frequency of the auxiliary compressed air supplied by the auxiliary compressed air inlet device 9 as a function of the powder output frequency of the powder conveyor chamber 4 in at least one of the following ways: for example as a manual adjustment and/or preferably automatically controllable or preferably regulatable. The auxiliary compressed air pulse frequency can thereby be advantageously increased with increasing powder output frequency and reduced with decreasing powder output frequency.

In accordance with a further preferential embodiment of the invention, the control unit 90 can be advantageously designed so as to adjust the amount of auxiliary compressed air flowing through the auxiliary compressed air inlet device 9 per unit of time as a function of the amount of powder conveyed in at least one of the following ways: for example as a manual adjustment and/or preferably automatically controllable or preferably regulatable.

The control unit 90 of the powder spray-coating device 100 can be designed for the cited adjusting of the auxiliary compressed air pulse frequency or the cited adjusting of the auxiliary compressed air volume or for both adjustments. The control unit 90 can contain all the control elements or two or more control units can be provided. If desired, the auxiliary compressed air pulse frequency or the auxiliary compressed air flow volume can be manually set, a respective manual adjusting element can be provided thereto.

As indicated above, the powder inlet valve 7 and the powder outlet valve 8 of the inventive dense phase powder pump 1 are each preferably realized as a pinch valve since less coating powder can accumulate in pinch valves than in other types of valves and since powder deposits can be easily cleared by the air flowing through them. Pinch valves are valves able to be controlled by means of compressed air or by means of negative pressure. In principle, however, other controllable valves can also be used. There is moreover the possibility of using automatic valves, for example ball valves or check valves, instead of controllable valves which are controlled by the difference in pressure between the valve inlet side and the valve outlet side and thus automatically by the excess pressure and negative pressure prevailing in the powder conveyor chamber 4.

The above cited control unit 90 which is schematically suggested in FIG. 3 is used to control the operation of the dense phase powder pump 1. The control unit 90 is designed to appropriately actuate the individual controllable components of the dense phase powder pump 1, particularly the control valves V1, V2, V3, V4 and V5 and coordinate their operation.

A further control valve V6 is provided in the embodiments of the inventive powder spray-coating device depicted schematically in FIGS. 4 and 5, by means of which the powder conveyor chamber 4 is subjected to high pressure during a cleaning cycle of the dense phase powder pump 1.

The control unit 90 is preferably designed so as to open the control valve V4 in preparation of the suction phase of the powder conveyor chamber 4 so that the compressed air provided in the pressure storage unit 57 or by the compressed air source 58 respectively is directed via the compressed air supply line 56 and the air exchange vent 16 into the pressure chamber 15.2 of the powder outlet valve 8 designed as a pinch valve. As a consequence, the flexible elastic tube 14.2 of the powder outlet valve 8 designed as a pinch valve is squeezed, resulting in the closing of the powder path through the powder outlet valve 8 provided by the flexible elastic tube 14.2.

With the closing of the powder outlet valve 8, the control unit 90 fluidly couples the air exchange vent 13 provided in the housing 12 of the powder conveyor chamber 4 to the vacuum source 52 so as to generate a negative pressure inside the powder conveyor chamber 4 such that coating powder can be suctioned into the powder conveyor chamber 4 via powder inlet 2 of the dense phase powder pump 1 and (open) powder inlet valve 7 as well as powder inlet 5 of the powder conveyor chamber 4.

In accordance with preferential embodiments of the invention, the control unit 90 produces a control signal in initiating the suction phase of the dense phase powder pump 1 to generate the negative pressure in the powder conveyor chamber 4 at the earliest simultaneously to or preferably after a predetermined delay period following a control signal for opening the powder inlet valve 7 so that the negative pressure in the powder conveyor chamber 4 begins to build at the earliest at the same time the powder inlet valve 7 opens, preferably after the cited predetermined delay period following the opening of the powder inlet valve 7. The predetermined delay period is preferably in the range of between 0 ms and 50 ms at a powder conveyor chamber 4 conveyance cycle of approximately 200 ms.

Doing so thereby achieves the negative pressure in the powder conveyor chamber 4 having a weaker counteraction on an opening movement of the powder inlet valve 7, particularly if it is a pinch valve, at least at the time the powder inlet valve 7 begins its opening movement, than is the case in the prior art where the pressure usually already drops in the respective powder conveyor chamber prior to the opening of the powder inlet valve.

The control valve V3 is thereafter fluidly coupled to the compressed air supply line 56, in consequence of which an excess pressure is applied in the pressure chamber 15.1 of the powder inlet valve 7 designed as a pinch valve which effects a squeezing of the flexible elastic tube 14.1 of the powder inlet valve 7 designed as a pinch valve. Doing so closes the powder inlet valve 7. Control valve V4 depressurizes the air exchange vent 17 of the pressure chamber 15.2 of the powder outlet valve 8 designed as a pinch valve or evacuates the air from the pressure chamber 15.2 respectively. Due to the elasticity of the tube 14.2 of the powder outlet valve 8 designed as a pinch valve, it then immediately changes into its open state.

At this instant or immediately thereafter, the control valve 90 switches control valve V1 so as to fluidly couple the air exchange vent 13 disposed in the housing 12 of the powder conveyor chamber 4 to the compressed air source 58. The compressed air then flows via the compressed air supply line 50, the control valve V1, the intermediate chamber 11 and the filter element 10 into the powder conveyor chamber 4 and expels the portion of powder previously suctioned inside through the powder outlet 6 of the powder conveyor chamber 4.

With the help of the conveying compressed air fed into the powder conveyor chamber 4 via the compressed air supply line 50, the portion of powder is then further conveyed through the open powder outlet valve 8, the filter tube channel 18 of the auxiliary compressed air inlet device 9 and the powder outlet 3 of the dense phase powder pump 1.

The control unit 90 is in particular designed to pulse auxiliary conveying compressed air into the powder path between the powder outlet valve 8 and the powder outlet 3 of the dense phase powder pump 1 via auxiliary compressed air inlet device 9. It has hereby proven advantageous for the auxiliary conveying compressed air fed into the powder path via the auxiliary compressed air inlet device 9 in pulses to be continuously supplied over the entire powder conveyor chamber 4 suction phase or during a predetermined or predeterminable part of the suction phase so as to thereby effectively prevent and/or minimize pulsations in the flow of powder discharged from the dense phase powder pump 1.

Specifically, the control unit 90 is to this end designed to fluidly connect the air exchange vent 21 of the compressed air chamber 19 of the auxiliary compressed air inlet device 9 to the compressed air source 58 whenever the powder outlet valve 8 is closed.

In the embodiments of the inventive powder spray-coating device 100 depicted in FIGS. 4 and 5, the individual compressed air supply lines 50, 54, 56 and 59 run into a controller 91 which coordinates and controls the compressed air supply of the individual components of the powder spray-coating device 100. In particular, the controller 91 can also set the amount of auxiliary compressed air fed to the powder spray-coating gun 102 per unit of time via a compressed air inlet 106 of the powder spray-coating gun 102, which serves in the atomizing, forming and/or otherwise influencing of the coating powder to be sprayed by the powder spray-coating gun 102, and/or the amount of electrode flushing air fed to the powder spray-coating gun 102 per unit of time via the compressed air inlet 107 of the powder spray-coating gun 102.

As can particularly be noted from the schematic representation provided in FIG. 5, it is advantageous to employ components for the feeding of the auxiliary compressed air into the powder path which are structurally identical here to the components of the powder conveyor chamber which feed conveying compressed air into the powder conveyor chamber 4 during the discharge phase. To be understood by the term "structurally identical" as used herein is in particular the size and the structure of the filter tube 17 used in the auxiliary compressed air inlet device 9 and the filter 10 used in powder conveyor chamber 4. This measure ensures that the conveying compressed air introduced into the powder conveyor chamber 4 during the discharge phase undergoes the same pneumatic resistance as the auxiliary compressed air fed into the powder path downstream of the powder outlet valve 8 by way of the auxiliary compressed air inlet device 9 during the powder suction phase.

Figure 6:
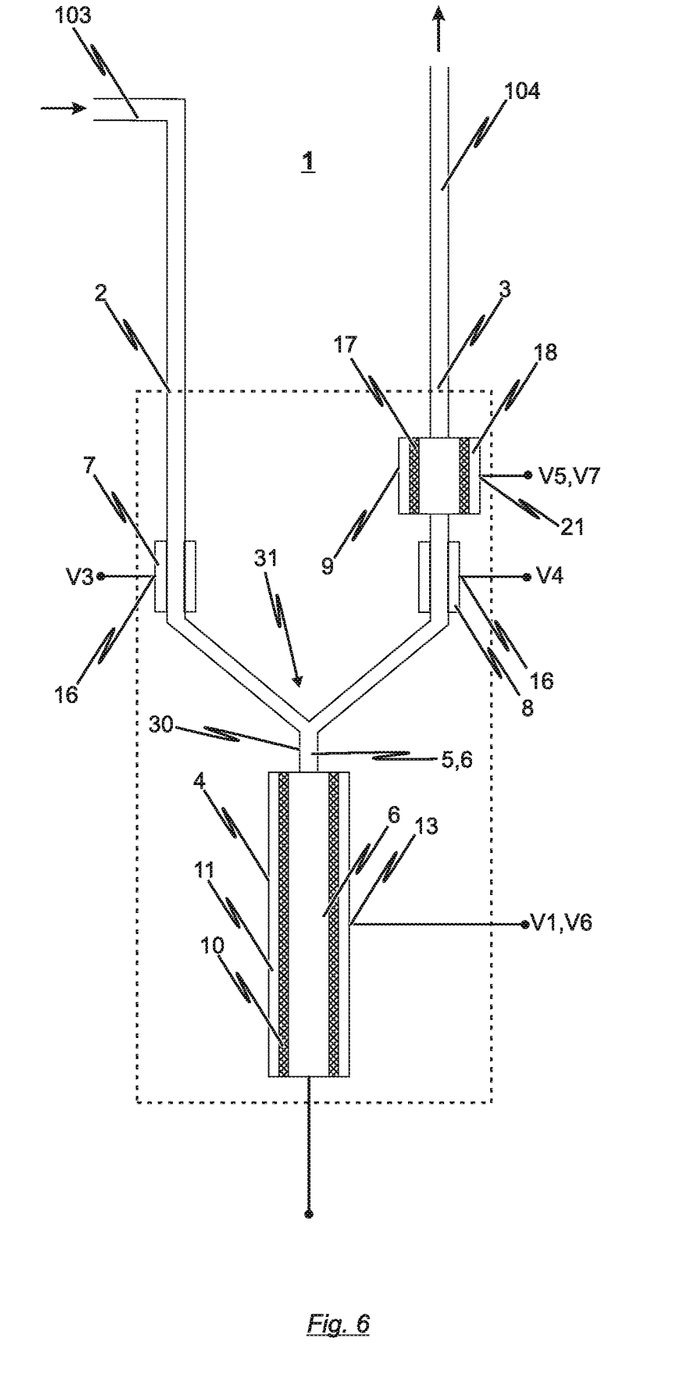
FIG. 6: a schematic representation of a third example embodiment of the inventive dense phase powder pump.
Figure 7:
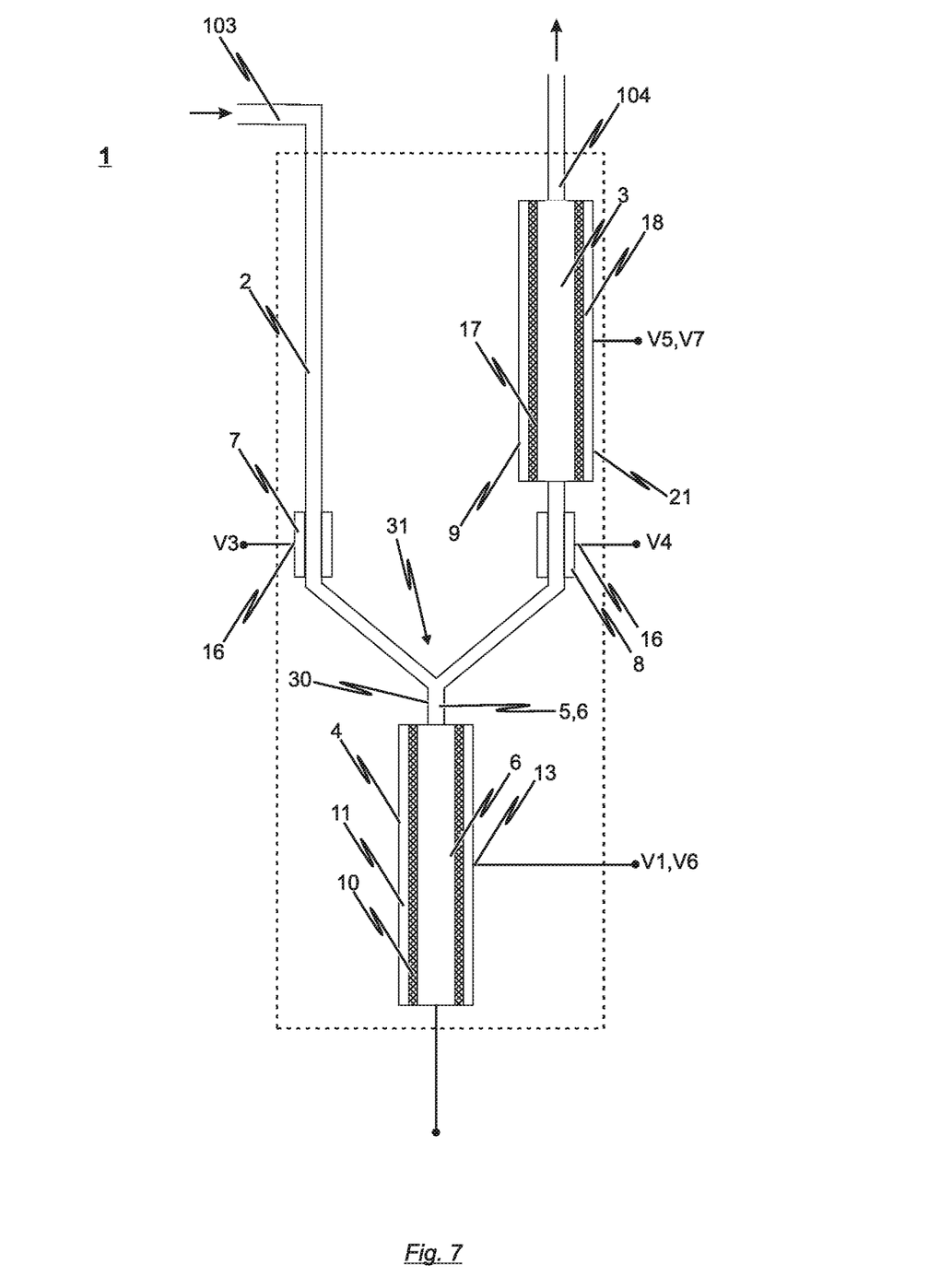
FIG. 7: a schematic representation of a fourth example embodiment of the inventive dense phase powder pump.

The inventive solution is not limited to a dense phase powder pump 1 having a powder inlet 2 at a first end region and a powder outlet 3 at an opposite second end region as shown in the representations pursuant to FIGS. 1 to 5. In fact, the inventive solution is also suited to embodiments in which—as FIGS. 6 and 7 depict schematically—the single powder conveyor chamber 4 of the dense phase powder pump 1 comprises a powder passageway 30 at an end region which serves both as powder inlet as well as powder outlet for the powder conveyor chamber 4. In the embodiments depicted in FIGS. 6 and 7, the powder inlet 2 of the dense phase powder pump 1 is fluidly coupled to the powder passageway 30 of the powder conveyor chamber 4 via powder inlet valve 7 and the powder outlet 3 of the dense phase powder pump 1 fluidly coupled to the powder passageway 30 of the powder conveyor chamber 4 via powder outlet valve 8. A distributor 31 is in particular employed here, configured in the embodiments depicted in FIGS. 6 and 7 as a Y-piece. Said distributor 31 fluidly couples the powder passageway 30 of the powder conveyor chamber 4 to the powder inlet valve 7 on one side and to the powder outlet valve 8 on the other side.

The embodiment of the dense phase powder pump 1 schematically depicted in FIG. 7 differs from the embodiment shown in FIG. 6 by the auxiliary compressed air inlet device 9 being of identical configuration to the conveying compressed air inlet device of the powder conveyor chamber 4 in order to equalize the pneumatic resistances occurring upon the introduction of conveying compressed air and upon the introduction of auxiliary compressed air.

The structure and functioning of the remaining components of the embodiments depicted in FIGS. 6 and 7 correspond to the components of the embodiments according to FIGS. 1 to 5, whereby reference is made in this context to the previous remarks.

The invention is not limited to the example embodiments of the inventive dense phase powder pump depicted in the drawings but rather yields from a synopsis of all the features disclosed herein together.

The invention claimed is:

1. A dense phase powder pump for conveying coating powder in a powder path from a first powder reservoir to a second downstream powder reservoir or a downstream powder spray-coating gun or similar device for spraying coating powder disposed downstream of the dense phase powder pump, wherein the dense phase powder pump is designed as a single-chamber dense phase powder pump and comprises just one single powder conveyor chamber for the conveying of coating powder, wherein:

at least one auxiliary compressed air inlet device opens into at least one location in the powder path after a powder outlet valve of the dense phase powder pump to supply auxiliary compressed air as additional conveying compressed air as needed, the dense phase powder pump comprises a powder inlet connected or connectable to the first powder reservoir and a powder outlet connected or connectable to the second reservoir or to the powder spray-coating gun or other such mechanism for spraying coating powder, the single powder conveyor chamber comprises a powder passageway at an end region of the single powder conveyor chamber, wherein said powder passageway serves both as a powder inlet and a powder outlet, and the dense phase powder pump further comprises a powder inlet valve by means of which the powder passageway of the single powder conveyor chamber is fluidly connected or connectable to the powder inlet of the dense phase powder pump and the powder passageway of the single powder conveyor chamber is or can be fluidly connected to the powder outlet of the dense phase powder pump by means of the powder outlet valve.

2. The dense phase powder pump according to claim 1, wherein a distributor, in the form of a Y-piece, is further provided for fluidic coupling of the powder passageway of the conveyor chamber to the powder inlet valve on a first side of the distributor and the powder outlet valve on a second opposite side of the distributor.

* * * * *